(No Model.)
F. F. BRAILLARD.
BOOK COVER.
No. 399,734. Patented Mar. 19, 1889.
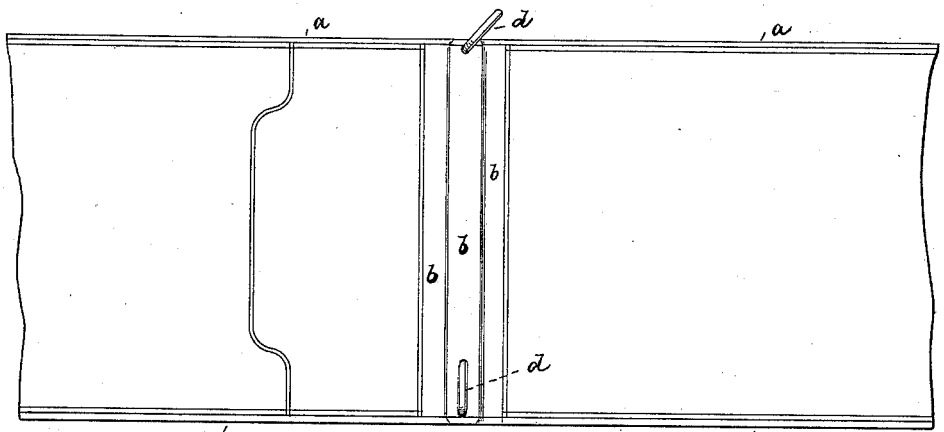
FIG. 1
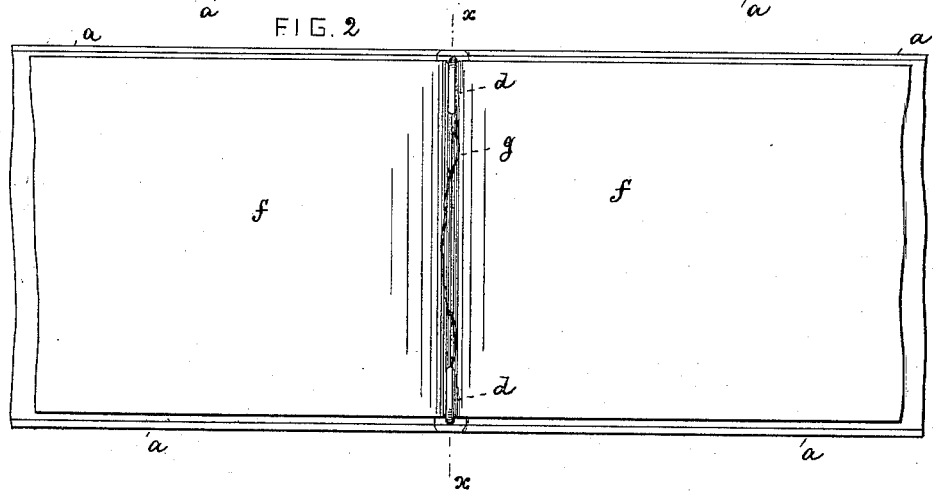
FIG. 2
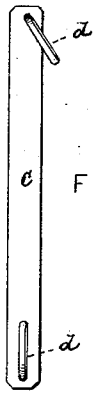   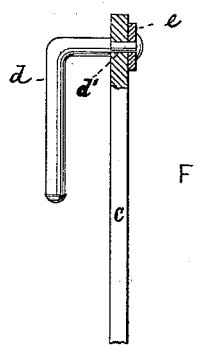
FIG. 3   FIG. 4   FIG. 5   FIG. 6
WITNESSES
Wm. A. Lowe
Wm. H. Wagner
INVENTOR
F. F. Braillard
by his attorneys
Roeder & Briesen

UNITED STATES PATENT OFFICE.

FRANCIS F. BRAILLARD, OF BROOKLYN, NEW YORK.

BOOK-COVER.

SPECIFICATION forming part of Letters Patent No. 399,734, dated March 19, 1889.

Application filed December 4, 1888. Serial No. 292,588. (No model.)

*To all whom it may concern:*

Be it known that I, FRANCIS F. BRAILLARD, of Brooklyn, New York, have invented an Improved Book-Cover, of which the following is a specification.

This invention relates to a book-cover so constructed that the leaves of the book when filled up may be readily removed and replaced by new leaves.

The invention consists in the various features of improvement more fully pointed out in the claims.

In the accompanying drawings, Figure 1 is an inner view of the book-cover with the leaves removed. Fig. 2 is a similar view with the leaves in place. Fig. 3 is a front view, and Fig. 4 a rear view, of the bar carrying the hooks. Fig. 5 is a section through line $x\ x$, Fig. 2; and Fig. 6 is an enlarged sectional end view of one end of the bar.

The letter $a$ represents the cover of a book adapted to be folded centrally upon itself to inclose the leaves. Against the inner face of the cover $a$ there is glued or riveted the lining $b$. At the center of the cover the lining is, however, not attached, but leaves a pocket for the reception of a flat bar, $c$. The ends of this bar are properly concealed by the edges of the cover $a$ that overlap them, as shown in Fig. 5. This bar $c$ is perforated near each end for the admission of the shank $d'$ of a hook, $d$. This shank is reduced, as shown, to form an offset. The free end of shank $d'$ carries a washer, $e$, and is upset to secure the parts together. The hook-shanks $d'$ project through the lining $b$ and can be readily revolved, while the offset and the washer upon opposite faces of bar $c$ prevent longitudinal motion of the shanks.

A number of leaves, $f$, preferably stitched by cord $g$, are placed upon the inner face of the cover $a$, the hooks being first swung outward or in the position of the upper hook in Fig. 1. Then the hooks are both swung inward to engage the leaves $f$ and confine them in place, as shown in Fig. 2. It will thus be seen that the leaves may be readily removed and replaced by simply opening or closing the hooks.

What I claim is—

1. The combination of cover $a$ with perforated bar $c$ and with the hooks $d$, the shanks of which pass through said perforated bar, substantially as specified.

2. The combination of cover $a$ with perforated bar $c$ and with hooks $d$, having reduced shanks $d'$, and washers $e$, substantially as specified.

3. The combination of cover $a$ and lining $b$, forming a pocket between them, with the perforated bar $c$ within said pocket, and with the hooks $d$, the shanks of which pass through said perforated bar, substantially as specified.

FRANCIS F. BRAILLARD.

Witnesses:
F. v. BRIESEN,
WM. WAGNER.